Nov. 27, 1951     E. SWARTZ     2,576,315
APPARATUS FOR PREPARING SOLUTIONS
Filed Jan. 20, 1948     5 Sheets-Sheet 1

Inventor
Edward Swartz
by Roberts Cushman & Grover
Att'ys.

Nov. 27, 1951 — E. SWARTZ — 2,576,315
APPARATUS FOR PREPARING SOLUTIONS
Filed Jan. 20, 1948 — 5 Sheets-Sheet 2

Inventor
Edward Swartz
by Roberts, Cushman & Grover
Att'ys.

Nov. 27, 1951 E. SWARTZ 2,576,315
APPARATUS FOR PREPARING SOLUTIONS
Filed Jan. 20, 1948 5 Sheets-Sheet 3
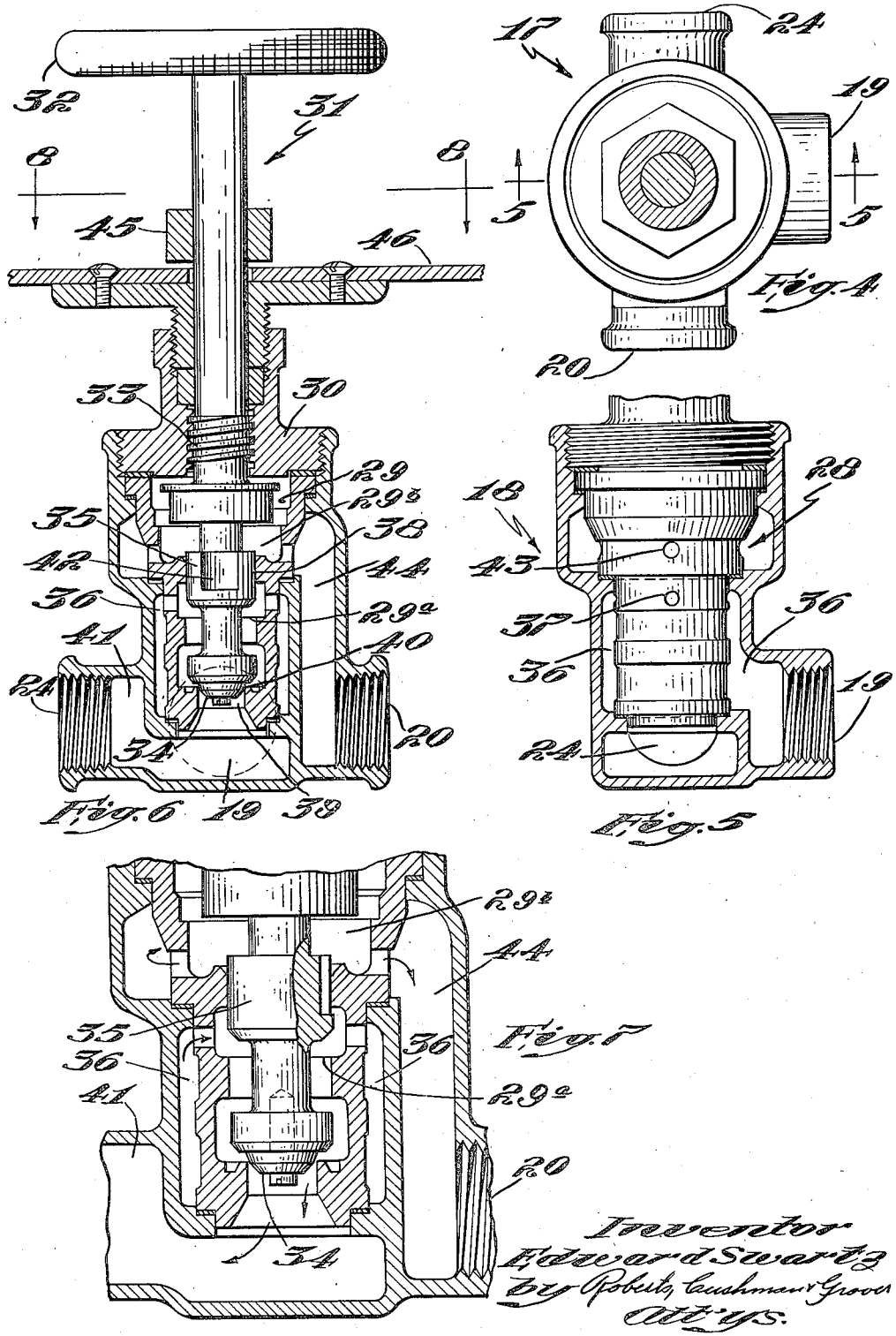

Nov. 27, 1951     E. SWARTZ     2,576,315
APPARATUS FOR PREPARING SOLUTIONS
Filed Jan. 20, 1948     5 Sheets-Sheet 4
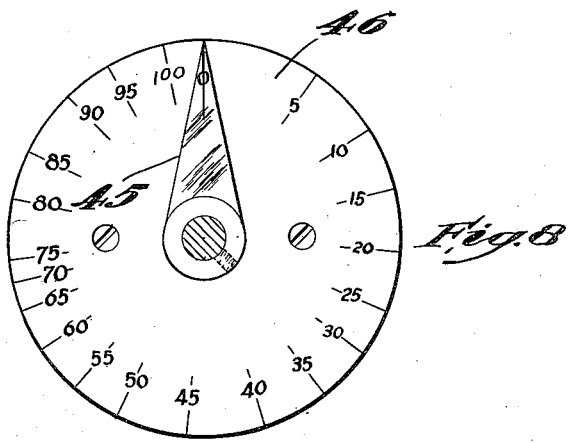
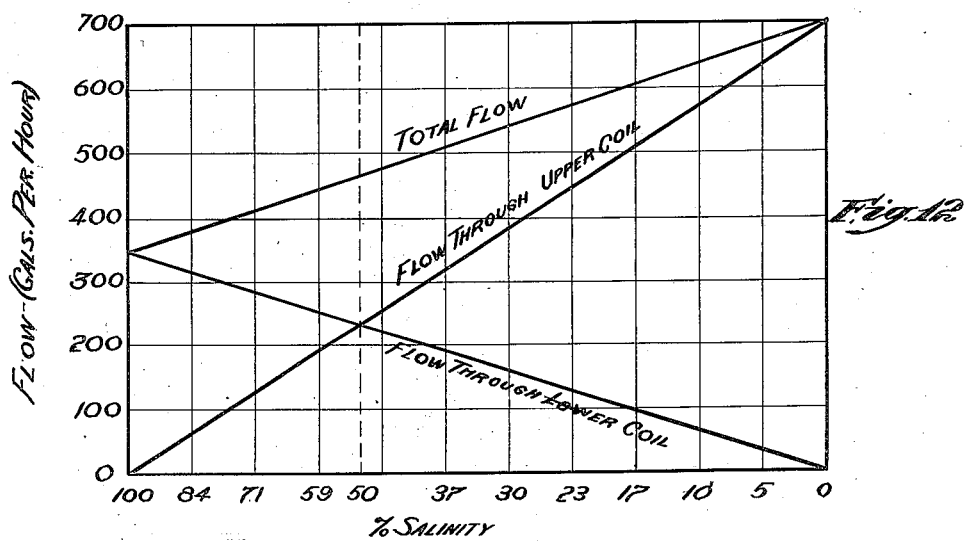
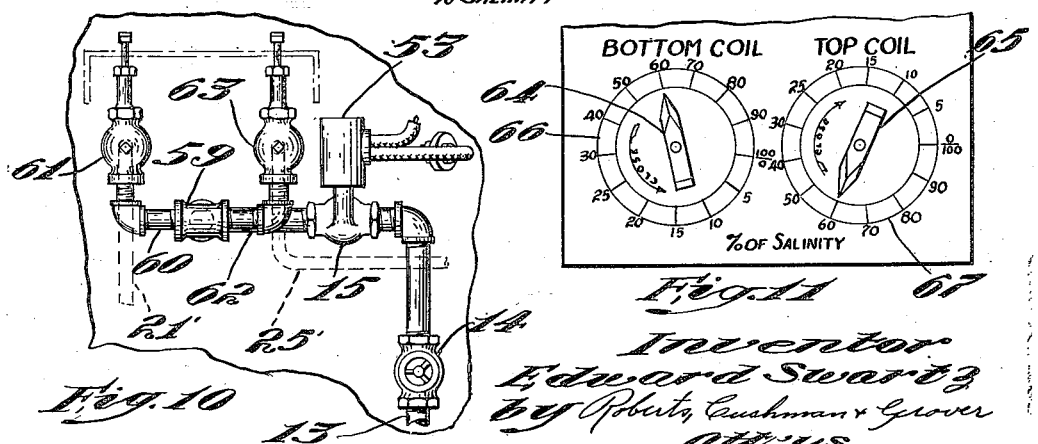

Patented Nov. 27, 1951

2,576,315

UNITED STATES PATENT OFFICE 2,576,315

APPARATUS FOR PREPARING SOLUTIONS

Edward Swartz, Belmont, Mass.

Application January 20, 1948, Serial No. 3,297

1 Claim. (Cl. 23—272)

This invention relates to a method of and apparatus for preparing solutions of soluble solids, such as aqueous solutions of salts, or brines, of predetermined concentrations and in large volumes.

In the art of dissolving solids, it is common practice to prepare solutions in batches, using appropriate proportions of the solid to be dissolved and of the solvent, and subjecting the resulting mixture to various conditions of agitation, temperature, and the like, to promote and to complete the solvent action.

In some instances, however, and especially where large volumes of solutions are required, which may be of the same or different concentrations from time to time, such procedures and apparatus are not convenient and in many respects may be quite inadequate.

In operations where solutions of different concentration are frequently required it is desirable to obtain them without resorting to different procedures or providing separate dissolving tanks for each concentration of solution that may be needed.

By the present invention solutions may be prepared of a wide range of predetermined concentrations, from a single source of solid matter to be dissolved and a single source of solvent, and the concentration of the solution produced may be rapidly adjusted, according to the quantity or concentration of solution required.

It is found that by contacting any given solid to be dissolved with a continuous stream of a solvent thereof, for sufficient time and in suitable proportions, a preliminary solution of the solid may be produced, of a predetermined controlled concentration, (preferably substantially saturated, but which may be less than saturated, or re-adjusted from time to time if desired) and that by introducing a stream of fresh solvent into the concentrated solution thus prepared, and controlling the relative volumes or rates of the solution formed and of the solvent stream, a continuous supply of an ultimate solution of any desired concentration may be obtained. Moreover, such concentration will be constant, as effected and maintained, and yet may be varied at will.

It is found that by providing a sufficient mass of soluble solid matter, which is open and presents an adequate or excessive surface area, a continuous stream of a solvent liquid may be passed therethrough and, if the rate of flow of the solvent does not exceed the rate of solubility of the solid, the resultant stream of solution will be substantially a saturated solution with respect to the solid. In such case, its concentration presents a constant and absolute value. Consequently the effluent stream of solution may be mixed with a stream of solvent to produce an ultimate solution of any concentration, corresponding to the ratio of the volume of the stream of solution to the volume of the stream of solvent.

The mixing of a stream of a solution of a solid having a concentration up to and including saturation and a stream of the solvent may be effected rapidly, continuously and completely, resulting in a uniform, homogeneous solution of any desired lower concentration, and such concentration maintained constant as long as desired. By changing and controlling the ratio of the volumes of such streams of solution and of solvent, the concentration of the resultant stream of the ultimate solution produced may be likewise changed and controlled, and determined, and thereafter maintained constant at such re-adjusted ratio.

The invention will be described with reference to its application for the preparation of large volumes of solutions of readily soluble salts, such as of common salt in water, together with apparatus suitable for this purpose. A representative example of such apparatus is illustrated in the accompanying drawings, in which:

Fig. 4 is an enlarged top view of the valve, per se, as shown in Fig. 3;

Fig. 5 is a cross-sectional view of a portion of the valve in the plane of 5—5 of Fig. 4;

Fig. 6 is a cross-sectional view of the valve housings, showing the whole valve, and including the valve handle and dial, in the plane 6—6 of Fig. 1;

Fig. 7 is an enlarged detail cross-section of a portion of the valve, as shown in Fig. 6, but showing the valve stem raised by one-quarter turn;

Fig. 8 is a view of the valve dial, per se, as seen from the plane 8—8 of Fig. 6, with a scale 0-100 indicating the salinity of the resulting solution in percentage of saturation;

Fig. 10 is a detail, with other portions broken away, showing a modified form of valve arrangement, using two separately controlled valves, but corresponding generally to the valve arrangement shown in Fig. 3;

Figure 1:
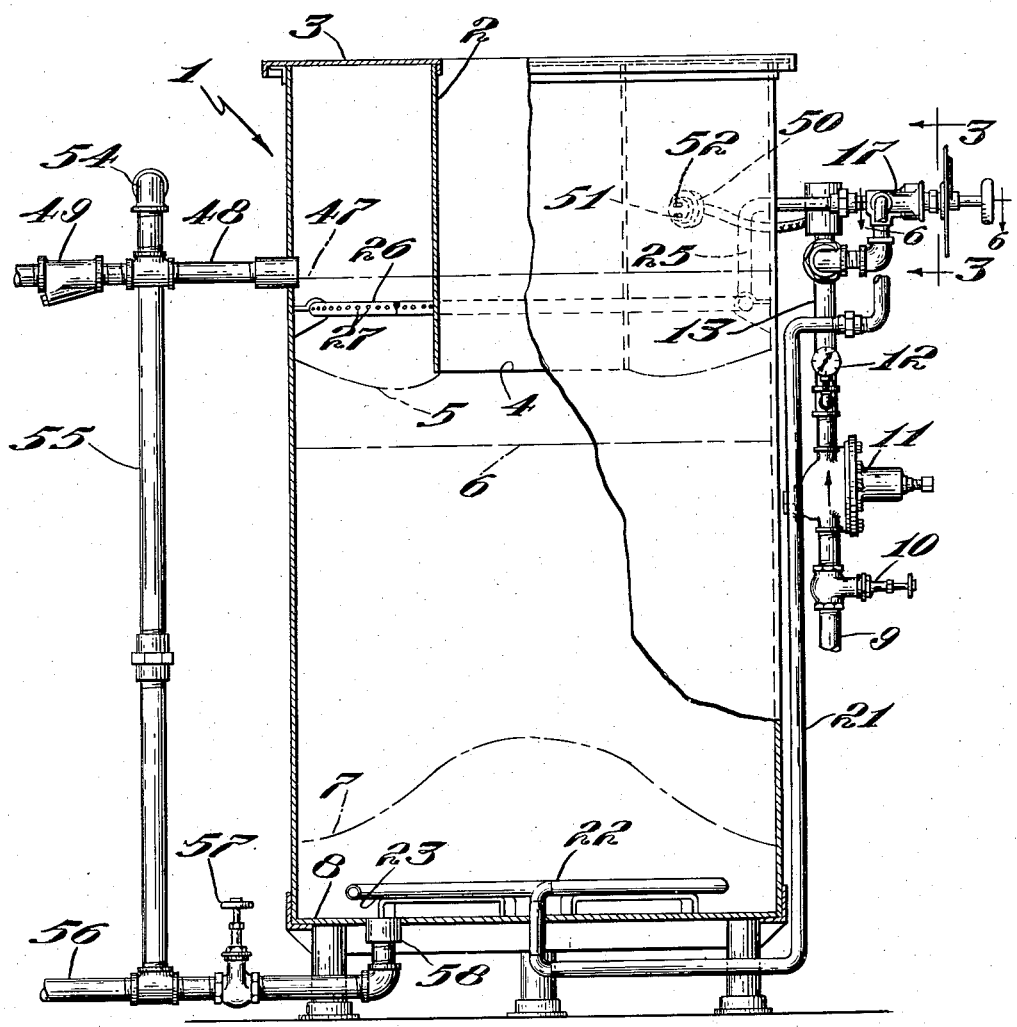
Fig. 1 is a side elevation, with parts broken away, of a dissolving tank and attachments for the control of the introduction of the salt and for the control of the introduction of water, as the solvent.

Fig. 11 is a view of the two dials, corresponding to the two valves shown in Fig. 10; and Fig. 12 is a chart showing the settings of the valves with reference to a 360° turn of the valve stems of the modification shown in Figs. 10 and 11, and the corresponding flow of water through the lower coil, through the top coil, and the total flow of resulting brine solution in gallons per hour against a corresponding scale of salinity of the ultimate solution, as indicated directly upon the dials of the valve in percentages, 0-100%.

In carrying out the process of the invention in the apparatus illustrated, the salt in granular form is charged into a dissolving tank 1 through the central cylindrical hopper 2 which is supported on the top by the cover 3. The salt is preferably in uniformly granular condition but may be either coarse or fine, as desired, or of mixed sizes of crystals. The dissolving tank may be filled with the salt up to the lower end 4 of the hopper 2 or to any intermediate height, as desired, as indicated by the dotted lines at levels 5, 6 or 7.

If it is desired to operate the salt bed at the level 5, a continuous supply may be furnished through the hopper 2 from a bin above (not shown) by continuous flow under gravity. If a lower level is had, as indicated at 6, the sale may be automatically supplied in continuous amounts or in successive batches. Likewise, a lower level of salt may be provided, for any reason, as at 7. In the latter case, however, a minimum depth of salt bed must be maintained at all times above the bottom 8 of the dissolving tank, for reasons which will become manifest from the following disclosure.

Referring to Fig. 1, a continuous supply of water is provided, as through the water main 9, controlled by valve 10 and passing through a pressure regulator 11, thereby to assure a predetermined head or water pressure of the main supply line delivered to the apparatus, as indicated by the pressure valve 12. This main supply flows thence through the pipe 13 controlled by a positive shut-off valve 14 and through a positive but automatically controlled shut-off valve 15 and coupling 16 to the control valve 17 as more specifically illustrated in Fig. 3.

Referring to Figs. 4 and 5 which show the valve 17 in greater detail, it will be observed that the valve comprises an outer housing 18 having an inlet 19 thereto adapted to receive the main water supply as delivered to the apparatus.

Figure 3:
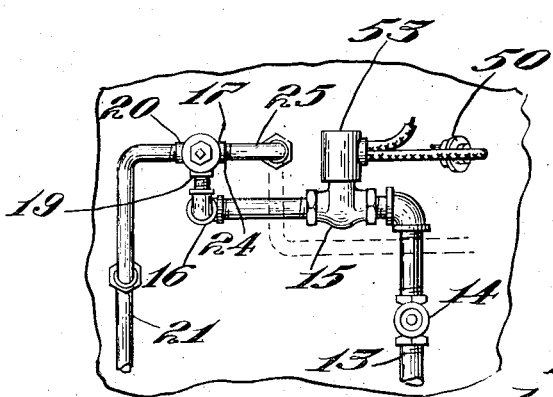
Fig. 3 is a detail view of the valve and its connections, as shown at the right of Fig. 1, at right angles thereto.
Figure 2:
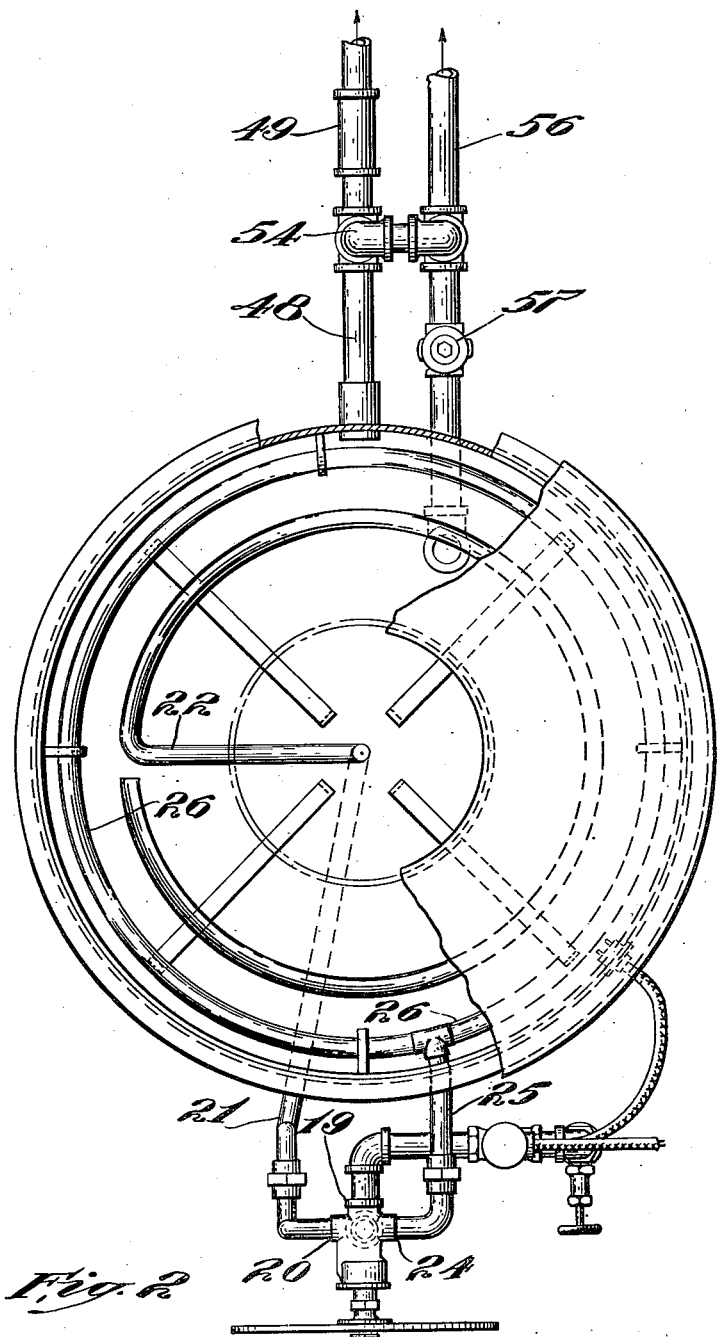
Fig. 2 is a plan view of the dissolving tank and appurtenant attachments shown in Fig. 1.

The valve 17 is devised and constructed to divide the main stream of water supplied thereto into two streams, one of which passes through the outlet 20 shown in Fig. 4 and through the pipe 21 as shown in Figs. 1 and 3, to the bottom portion of the dissolving tank 1 through the perforated coil 22 mounted in the bottom portion of the dissolving tank slightly above the bottom of the tank and having perforations 23 therein (Figs. 1 and 2) directed downwardly against the bottom 8 of the dissolving tank 1. The total cross-sectional area of the perforations 23 is greater than the cross-sectional area of the coil 22, the water pipe line 21 leading thereto, or the main pipe line 9. For example, with half-inch pipe, perforations 23 in coil 22, may vary from $\frac{1}{32}''$ diameter at the inlet to $\frac{3}{16}''$ in diameter at the extreme opposite end of coil 22 and their total areas shall equal or exceed the total cross-section of the half-inch pipe.

The other outlet 24 from the valve 17 (Figs. 2, 3 and 4) leads the other stream of water through the pipe 25 into the upper portion of the dissolving tank through the coil 26 which is provided with perforations 27, as shown in Fig. 1. These perforations 27 likewise should present a total cross-sectional area equal to or greater than the cross-section of the coil 26, pipe 25 or main water line 9, and should also increase in their cross-sectional areas, from the inlet portion of coil 26 to the extreme opposite end of coil 26, to equalize flow therethrough on all portions of the coil.

The outer housing 18 of valve 17 is provided with an inner housing 28 which is generally cylindrical in shape, having a hollow central portion 29, and closed by the top 30 which is screw-threaded into the upper portion of the outer housing 18.

Mounted longitudinally of and within the inner housing 28 is provided the valve represented generally by the numeral 31 having a handle 32 at its outer end and a valve stem screw-threaded at 33 in the upper portion of the housing 28 and provided with a valve 34 at its lower extremity and a valve member 35 intermediate thereof.

The controlled water supply to the apparatus, therefore, under a constant head, is delivered into the inlet 19 of valve 17, passes through the space 36 between the housing 18 and the inner housing 28, as shown in Figs. 5, 6 and 7, and thence through the openings 37 through the inner housing 28 into the lower portion 29ª of the space 29 between the outer housing 18 and the inner housing 28. This lower space 29ª within the housing 28 is separated from the upper portion 29ᵇ of the space 29 by the inwardly projecting shoulder portion 38 of the inner housing 28 and the valve member 35 which seats thereagainst. The lower end of the area 29ª opens outwardly through the central aperture 39, the margin 40 of which constitutes a valve seat for the valve 34 provided on the lower end (as shown in Fig. 6) of the valve stem 31. This opening leads into the space 41 in the lower portion of the housing 18 and thence to the outlet 24 of the valve 17.

The upper portion 29ᵇ of the space 29 as above described is separated from the lower portion 29ª by the seating of the valve 35 against the shoulder 38 except, however, for the recess 42 (as shown in Fig. 6) which provides a bypass between the chamber 29ª and the chamber 29ᵇ, the effective cross-section of which, however, is determined by the vertical position of this recess with respect to its engagement with the shoulder 38. As shown in Fig. 6, it is open to its maximum position when valve 34 is closed against valve seat 40.

The chamber 29ᵇ opens through apertures 43 passing through the inner housing 28 into the chamber 44 between the inner housing 28 and the outer housing 18. This chamber 44 leads in turn to the outlet 20 of the valve 17 above mentioned.

The valve stem 31 is provided with a pointer 45 which, as shown in Figs. 6 and 8, swings over the dial 46 upon rotation of the handle 32. This dial is divided and calibrated to indicate the concentration of solution delivered in accordance with its corresponding settings in terms of percentage of saturation of the resulting solution.

After charging the dissolving tank with salt, as above described, the pressure control device 11 will be set to deliver the main supply of water from the pipe 9 at the pressure as indicated by the gauge 12 (e. g. 20 pounds per square inch, with a ¾" supply line). The valve 10 will then be open. The valve 14 and the valve 15 will then be opened, the function and operation of which will be described below.

The valve 17 will then be opened by the handle 32 to a position as indicated by the pointer 45 on dial 46 corresponding to the percentage of saturation or salinity of the solution to be prepared. In so doing the lower valve 34 will be raised from its valve seat 40 a definite distance and the recess 42 in the valve 35 will be raised a corresponding distance with respect to the shoulder 38. These movements will be respectively in a direction of opening the aperture from the chamber 29$^a$ into the chamber 41 and thence to the outlet 24 and closing the opening from the top of chamber 29$^a$ through the recess or bypass 42 into the upper chamber 29$^b$ and thence through the chamber 44 to the outlet 20.

In other words, with the valve turned down into its lowermost position, the bottom valve 34 will be closed and all of the water which is directed into chamber 29$^a$ will flow through the bypass recess 42 through the outlet 20 and thence through pipe 21 to the bottom of the dissolving tank. Upon passing out through the perforated coil 22 and into the bottom of the dissolving tank and thence upwardly through the charge of granular salt therein, this water supply will dissolve and become saturated with the salt and accumulate above the salt bed to a level as indicated at 47 from which it may overflow through the outlet pipe 48 and thence through the outlet pipe 49 to a reservoir or to the point of consumption. Under these conditions the depth of the salt bed must be such that the volume and rate of flow of water from the main 9 through valve 17 and out through the outlet 20 will produce a supernatant, saturated solution above the salt bed in dissolving tank 1. A depth of about 8 inches (or more) of salt is usually sufficient under conditions similar to those described above.

If from this position, however, the valve handle 32 is turned to raise the valve stem 31 and hence the valve or blb 34 from the valve seat 40, water will be permitted to pass from the chamber 29$^a$ downwardly into the chamber 41 and thence through the outlet 24 to the pipe line 25 and coil 26, and thence through the perforations 27 into the upper portion of the dissolving tank 1 and below the surface 47 of the saturated solution of brine formed therein. This introduction of water directly into the brine solution is effective to mingle with it promptly and completely so that upon overflowing through the pipe 48 and through the pipe 49 to the point of use, the resulting ultimate solution will have a concentration which is reduced proportionately to the valve setting and the resultant streams of saturated brine and pure water which are thus mixed.

At the same time the upward movement of the valve stem 31 raises the valve 35 and the recess 42 therein so as to proportionately close the bypass from the chamber 29$^a$ through the recess and into the upper chamber 29$^b$ and hence to reduce the flow of water through the opening 43 into the chamber 44 and thence to the outlet 20 and pipe 21 leading to the bottom portion of the dissolving tank 1.

Figure 9:
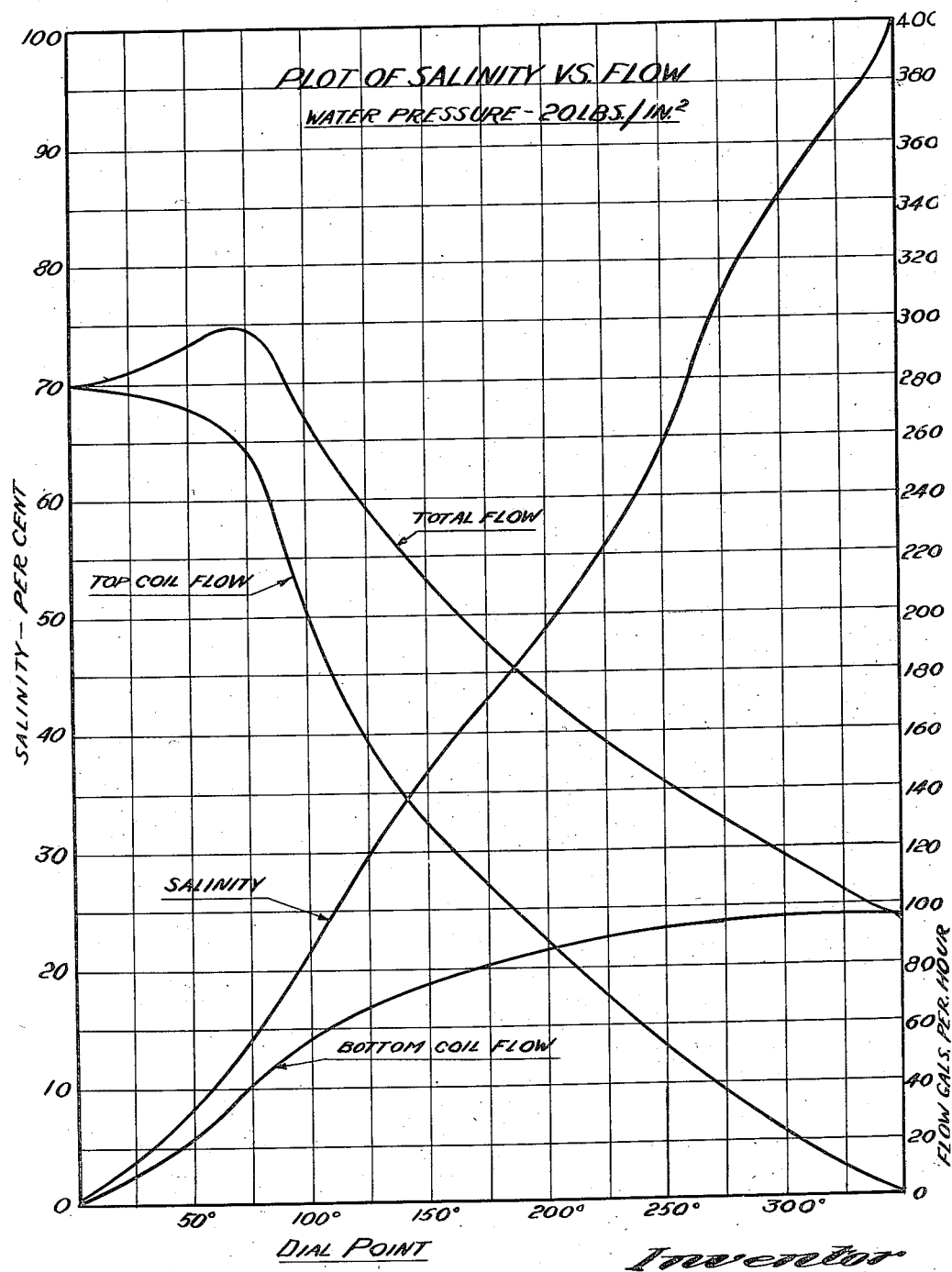
Fig. 9 is a chart showing the settings of the valve stem, with reference to a 360° turn, plotted against the corresponding flow of water through the bottom coil, through the top coil, the total flow of resulting brine solution, and the salinity, in percent concentration, of the corresponding ultimate brine solutions produced.

The result of thus reducing the flow of water to the bottom of the dissolving tank and introducing or increasing the flow of water to the upper part of the tank will determine the proportions of saturated solution and of water which are comingled in the upper portion of the dissolving tank immediately before it is drawn off for use. The resulting concentrations of the brine solutions produced may therefore be positively calibrated and are, as represented by the dial shown in Fig. 9, in terms of percentage of saturation or salinity.

As a matter of precaution against possible overflowing of the tank in case the brine is not being used as fast as made, or for any other reason, the automatic control valve 15 may be actuated by providing a plug 50 mounted at a suitable level in the upper portion of the dissolving tank 1 and having poles 51 and 52 projecting into the tank. With this arrangement, if the level of the brine solution should rise sufficiently so as to make contact between the poles 51 and 52, such contact would be effective to operate the solenoid 53, thereby to close the valve 15 and shut off the main supply of water to the apparatus.

As a further precaution against overflow, as in case of interference with electric current to operate the solenoid 53, an overflow syphon 54 may be provided in the outlet pipe 48 rising to a higher level than the poles 51 and 52 and discharging into the vertical outlet pipe 55 to the drain 56. The latter may also be connected to the bottom of the dissolving tank 1 through the valve 57 and the drain or sump 58 mounted in the bottom 8 of the dissolving tank for cleaning purposes.

As pointed out above, it is convenient to conduct the process and operate the apparatus upon the basis of a supply of water to the bottom of the dissolving tank such that upon passing through the bed of salt it dissolves the salt sufficiently to form a saturated solution whatever adjustment of the valve may be employed. However, it is to be understood that a solution of lesser concentration than saturated may be produced by the stream of water introduced into the bottom of the dissolving tank and the resulting stream of salt solution coming up through the salt bed into the upper portion of the tank 1, may be diluted by a proportionate amount of water mingled therewith at the top of the dissolving tank, to form a still more dilute solution, if such adjustment is desired.

In fact, instead of a single control valve 17, two independent control valves may be mounted in its stead, as indicated in Fig. 10. In this figure, like numerals indicate corresponding parts as illustrated in Fig. 3, but instead of the valve 17 the main water supply line, at the union 16, is provided with a T-connection 59, one arm of which leads through the pipe 60 to the valve 61 and thence into the pipe 21' leading to the bottom of the dissolving tank 1 and the other arm leading through pipe 62 to valve 63 and thence through pipe 25' to the upper portion of the dissolving tank 1.

With this arrangement the valves 61 and 63 may be any form of simple direct valve with pointers 64 and 65 respectively mounted on the stems thereof and above dials 66 and 67 respectively, likewise calibrated in terms of rates of flow or percentage of salinity of the solution to be prepared.

The operation of this modification of the method and apparatus of the invention will be clear when it is considered that a given supply of water is provided and is proportionately diverted below and above the bed of salt in the dissolving tank 1 and that the resulting stream of salt solution and of fresh water respectively are co-mingled in the upper portion of the dissolving tank and before being withdrawn therefrom in proportions as determined by the setting of the valves. Thus, as indicated in Fig. 11, if the valves 61 and 63 are set at 60 and 60, the resulting salinity of the solution prepared in the top of the dissolving tank run off through the pipe 48 will be 60% of the saturated solution.

In changing the operation of the method and apparatus from the production of a brine solution of one concentration to the production of a brine solution of a different concentration there will be a slight lag owing to the volume of supernatant brine solution contained above the salt bed in the top of the dissolving tank 1. After adjustment of the valve, this residual amount of brine solution will necessarily be carried out through the overflow pipe 48 to either spill or be sent to the point of use as desired. However, the amount of this residual solution of the previous concentration may be reduced by mounting the upper coil 26 closely beneath the top surface 47 of the brine because the mixing of the fresh water and of the brine solution will take place quickly and completely in a small volume and such residual solution of the previous adjustment is limited to that contained in the tank above salt level or the coil 26 and between it and the surface 47 leading to the outlet 48. It will be seen, therefore, that by the present method and apparatus a constant supply of solution may be prepared of predetermined and dependable concentration in continuous large volumes and yet may be changed promptly and at will from one concentration to another by suitable settings accordingly of a single valve or of two separate independent valves by which to determine the volume of concentrated or saturated solution and the volume of solvent with which it is co-mingled uniformly and completely as well as quickly, immediately before use.

It should be understood that the present disclosure is for the purpose of illustration only and that this invention includes all modifications and equivalents which fall within the scope of the appended claim.

I claim:

An apparatus for preparing aqueous salt solutions comprising a tank, hopper means extending downwardly into said tank for feeding salt to a bed therein and determining the height of said bed, means above the bottom of said tank for supporting a bed of salt thereon, a water inlet conduit, a branch conduit from said inlet conduit leading into the bottom of the tank and arranged therein with openings to give an uniform upflow of water over substantially the cross-sectional area of the bed, a second branch conduit extending into said tank above the outlet of the hopper having a plurality of openings to distribute water into the tank above the bed, an outlet conduit above the bottom opening of the hopper for determining the upper level of solution, and a common valve between said water inlet and said branch conduits constructed to regulate and adjust the relative flow through said branches to a desired concentration of solution for flow through said outlet.

EDWARD SWARTZ.

REFERENCES CITED

The following references are of record in the file of this patent:

UNITED STATES PATENTS

| Number | Name | Date |
| --- | --- | --- |
| 1,928,008 | Courthope | Sept. 26, 1933 |
| 1,975,749 | Lang | Oct. 2, 1934 |
| 2,006,085 | Lehmkuhl | June 25, 1935 |
| 2,083,076 | Mau | June 8, 1937 |
| 2,201,101 | Sinkwich | May 14, 1940 |
| 2,412,106 | Swartz | Dec. 3, 1946 |